United States Patent [19]

Jinsheng

[11] Patent Number: 4,772,042
[45] Date of Patent: Sep. 20, 1988

[54] FRAME TYPE FLEXIBLE AXLE SUSPENSION SYSTEM

[76] Inventor: Tang Jinsheng, No. B. 13, West, Jingwangfen Ganjiakou Beijing, China

[21] Appl. No.: 835,889

[22] Filed: Mar. 4, 1986

[30] Foreign Application Priority Data

Apr. 1, 1985 [CN] China .................. 85101438

[51] Int. Cl.⁴ .................. B60G 11/08
[52] U.S. Cl. .................. 280/669; 280/719
[58] Field of Search .............. 280/688, 694, 699, 719, 280/669, 668, 721, 723, 695, 700; 267/57.1 A, 57.1 R

[56] References Cited

U.S. PATENT DOCUMENTS

| | | | |
|---|---|---|---|
| 2,025,669 | 12/1935 | Lundelius et al. | 280/719 X |
| 2,075,531 | 3/1937 | Lundelius et al. | 280/719 X |
| 2,755,875 | 7/1956 | Muller | 280/723 X |
| 2,824,734 | 2/1958 | Linn et al. | 267/57.1 A |
| 4,313,618 | 2/1982 | Robinson | 280/719 |
| 4,458,918 | 7/1984 | Rumpel | 280/719 |
| 4,557,500 | 12/1985 | Collard et al. | 280/699 X |

Primary Examiner—John J. Love
Assistant Examiner—Charles R. Watts
Attorney, Agent, or Firm—Ladas & Parry

[57] ABSTRACT

Present invention is a frame type flexible axle suspension system designated for use on automobiles. This system mainly consists of two parallel spring steel shafts (12, 14), ends of which pass through a pair of link stands (16, 18) which are perpendicular to the spring steel shafts, thus form a frame construction (10). The link stands are connected with elevation shaft or drive shaft or wheel shaft. In addition, on each steel shaft there is a pair of elastic sleeves which are fastened on the spring steel shaft by means of hoops (24). Supporting stand (26) is connected with the hoops at one end and fixed on chassis or mainbeam of automobile at the other end. This frame type flexible axle suspension system can be used for front and rear axles of automobiles. It is also possible to select optimal combination of parameters of parts according to needs.

21 Claims, 8 Drawing Sheets

FRAME TYPE FLEXIBLE AXLE SUSPENSION SYSTEM

The invention relates to a frame type flexible axle independent suspension system for a motor vehicle, or an automobile, in particular.

It is well known that a suspension system is one of the important subassemblies of a modern automobile. It has elastic elements a buffer, a guiding mechanism and a stabilizing rod. It greatly affects the smoothness and stability of drive of an automobile, and also has influence on may performance features of an automobile, such as roadability, fuel economy, etc. Therefore, improvements to the suspension system have been proposed again and again; a great variety of different types of suspension systems exist. These can be classified into two group according to the form of guiding mechanism: dependent and independent suspension systems. Independent suspension systems can be further classified into a number of types. Up to now, the following types have been developed: dual cross arm type, single cross arm type, longitudinal arm type, single oblique arm type and sliding column with swinging arm type.

There is one common feature among all the above-mentioned independent suspension systems, that is, the various functions of the suspension system, such as guiding, buffering, shock absorbing, and stabilizing, are performed by separate but related mechanisms or elements. These mechanisms and elements are then combined together to from an intergral suspension system. People therefore focused their thoughts on improving these suspension systems on the separate but related mechanisms or elements to be combined into the systems. Problems of coordinating a resulting improved mechanism or element with the rest of the whole, integral suspension system were considered afterwards. For example, in order to improve the guiding function of a suspension, only the guiding mechanism of a suspension system was improved, the single and dual arm types having been developed in this way.

This brings about a lot of constructional problems for a suspension system:

(1) Suspension system is relatively complex due to the fact that it is combined from a number of mechanisms or elements;

(2) Therefore, there are more connecting elements in the suspension system; and (3) There is a big difference between the front and rear suspension constructions.

The above-mentioned constructional problems result in a larger amount of work during manufacturing, cause trouble and inconvenience in assembly and maintenance, and thus constitute one of reasons for the high cost of automobiles.

An object of the invention is, therefore, to propose a totally new and unique independent suspension system, that is, a frame type flexible axle independent suspension system.

Another object of the invention is to integrate guiding, stabilizing, buffering and hinging functions of a suspension system into a simplified frame construction to solve the above-mentioned problems in presently used suspension systems.

The frame type flexible axle suspension system of the invention includes two parallel shafts made of spring steel. Ends of these spring steel shafts pass through a pair of link stands, which are perpendicular to the shafts, thus forming a frame construction. The link stands are connected with an elevation shaft or driving shaft or wheel shaft for opposite-side wheels of an automobile. Four elastic sleeves are fixed on the spring steel shafts by hoops. Supporting stands are connected to the hoops for fixing to the chassis of the automobile. The elastic sleeves can stand both the normal pressure in the tangent direction and the shearing force in the traverse direction, thus ensuring secure connection of the suspension system with the vehicle.

Following is a description of the principles of this frame type flexibly axle suspension system.

Guiding function: When a wheel experiences a vertical force from the ground, the elasticity of the spring steel shafts allows the wheel between the adjacent supporting stands to swivel around a center in a vertically-arcuate direction for the guiding function. Proper adjustment of the distance between the elastic sleeves may change the distance from either wheel to its respective sleeve to adjust the radius within which the wheel can swivel in the vertically-arcuate direction and achieve the objective of adjusting the guiding radius.

The link stands are rigidly connected to the spring steel shafts through conic holes and nuts. As a result, when a wheel experiences a longitudinal force in the horizontal direction normal to the spring steel shafts (such as a traction force or a braking force), the wheel cannot be staggered in a horizontally-arcuate direction. Thus, smoothness of drive is ensured.

In summary, it can be seen that this construction performs the guiding function successfully for an independent suspension system.

Buffering function: When a wheel experiences a vertical impulse, i.e., a ground impact, it transfers the impact to the automobile through the elastic-metal frame and elastic sleeves at the supporting stands. Because elastic formation of the spring steel shafts thus absorbs the impact energy, the spring steel shafts perform the elastic-element buffering function.

Stabilizing function: In order to improve smoothness of drive of an automobile, the rigidity of elastic elements in its suspension system should be properly reduced. However, when an automobile makes a turn, centrifugal force then causes the automobile to slant so much as to reduce its stability. Therefore, automobiles with prior independent suspension systems have an additional spring steel shaft, which passes through the vehicle body and is fixed to opposite sides of the wheel shaft and, thus, to a certain degree, enhances the rigidity of the suspension system during a turn to decrease the slant of the vehicle body and improves its stability. The frame type flexible axle suspension system of the invention does not need such an additional stabilizing-shaft device, however, because when an automobile with it makes a turn, the outer end of each spring steel shaft deforms, thus effecting bending deformation of the whole spring steel shaft, and causing a spontaneous deformation of the inner end of each spring steel shaft. Therefore, the outer and inner sides of the automobile are lowering almost simultaneously during a turn, and its slant angle decreases one half at the least, thus to ensure stability.

In addition to these principles, the suspension system of the invention is of a simple frame construction. It thus combines the guiding, buffering, and stabilizing functions of present complex suspension systems into a simplified system. This has the following effects: the manufacturing process of the suspension elements is simplified; the number of parts, especially connecting elements such as hinges, is decreased; assembly and maintenance become easier, and the break down rate is lowered.

This independent suspension system also makes it possible to use a basically common construction for front and rear axle suspension. Therefore, it further simplifies the manufacturing process, reduces the amount of assembly work, and favors repair and maintenance work.

Moreover, the shapes and sizes of parts in its construction, as well as their relative positions, can be adjusted over a certain range. This helps in finding an ideal combination of parameters, and can conveniently satisfy vehicles. Therefore, this suspension system can be considered as a flexible suspension system which can be adjusted flexibly and conveniently for vehicles of various different types.

Hereunder is a detailed description, together with attached drawings of the invention, in which.

In a flexible axle suspension system of frame construction at 10 the material of two spring steel shafts 12, 14 is very important. Spring steel with good mechanical characteristics and high elastic strength, such as manganese steel and silicon manganese steel, are to be selected. In particular, spring steel 65Mn and 60 ($Si_2Mn$) are the more commonly used materials.

The shape, section size and length of the spring steel shafts 12, 14 are selected based on differences in type, construction and loading capacity of an automobile on a chassis at 40. In the frame construction at 10, the two spring steel shafts 12, 14 must be parallel. However, shapes, section sizes and lengths may be identical or not identical. Depending on design specification, these can be adjusted in a certain range. The section shape of the steel shafts may have various forms, such as round, oval, square, rectangular, etc. If spring steel shafts 12, 14 have round sections, then for a mini-automobile their diameter should not be less than 8 mm. For an ordinary car or a passenger-cargo dual purpose truck their diameter should be more than 20 mm.

Figure 1:
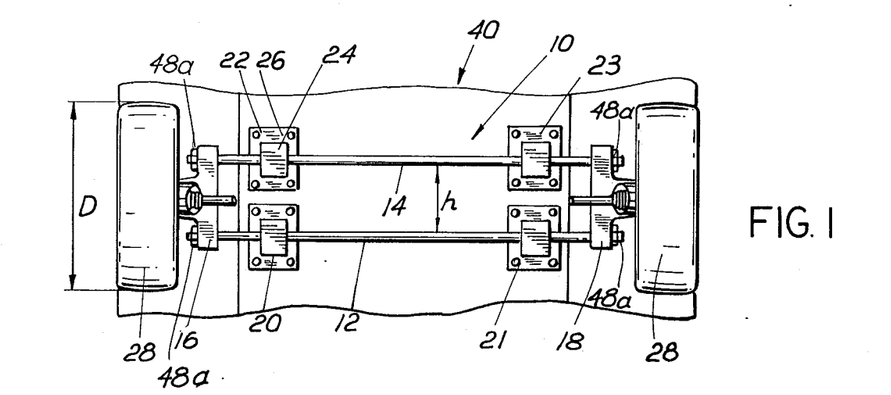
FIG. 1 is a bottom view of a down-supporting type front drive flexible axle suspension system.

The two, opposite ends of both spring steel shafts 12, 14 pass through respective conic holes 48, 50 (only one shown in FIG. 1, see FIG. 14) respectively of a pair of link stands 16 and 18 which are perpendicular to the steel shafts to form the frame constructions at 10 (see FIG. 1). The steel shafts should be firmly connected with the link stands. There should not be any displacement between them. For example, at each end of each spring steel shaft, there may be fine thread followed inwardly along the shaft by a conic transition part, the conicity of which should match the conicity of the conic holes 48, 50 through on the link stands 16, 18. Then each steel shaft is fixed to the link stands by nuts 48a.

The distance h between the two parallel spring steel shafts 12, 14 in the frame construction 10, i.e. the distance h (see FIGS. 14, 15, 16) between centers of the two holes 48, 50 in each link stand 16, 18, through which the steel shafts pass, should be selected according to vehicle body structure. The distance h between the two parallel steel shafts should not be less than one fifth the diameter D of wheels 28 of the automobile, that is $h \geq 1/5D$.

In brief, by changing the shape, section, size, or length of each of the two spring steel shafts 12, 14, or the distance between them, it is possible to change guiding the feature, natural frequency, and stability of this suspension system, thus to find an ideal combination of parameters to meet compound requirements of a suspension system for a certain kind of automobile. Due to the fact that this suspension system is merely a simple frame construction, such adjustment is relatively easy and simple.

Link stands 16, 18 play an important role in this flexible axle suspension system for an automobile. Each not only connects the spring steel shafts to form the frame construction 10, but also connects the suspension system with a drive shaft 32 or 44 or elevation shaft 30 (see FIG. 6) or wheel shaft 62 (see FIG. 11). It thus comprises an important part.

Link stands 16, 18 are perpendicular to the spring steel shafts 12, 14 and disposed at both ends of the steel shafts. They are integrated with the steel shafts by fasteners; thus the frame construction 10 is rigid. The link stands are essentially plate shaped (see FIG. 12, 13). On the link stands there are two conic holes 48, 50 for the spring steel shafts to pass through and a connecting part 57 for the drive shaft 32 or 44 or elevation shaft 30 or wheel shaft 62 to be connected. The conic holes mate with conic parts of the spring steel shaft ends. At the ends of the steel shafts are the sections with the fine thread, right next to the above-mentioned conic parts of the steel shafts. Thus, it is possible to integrate the steel shafts with link stands with fasteners such as the nuts 48a.

The shape and size of the link stands may be adjusted according to requirements. By making appropriate changes in the shape and size of the link stands according to a specific difference between front and rear axle constructions, it is possible to apply the suspension system both to front and rear axles.

Figure 14:
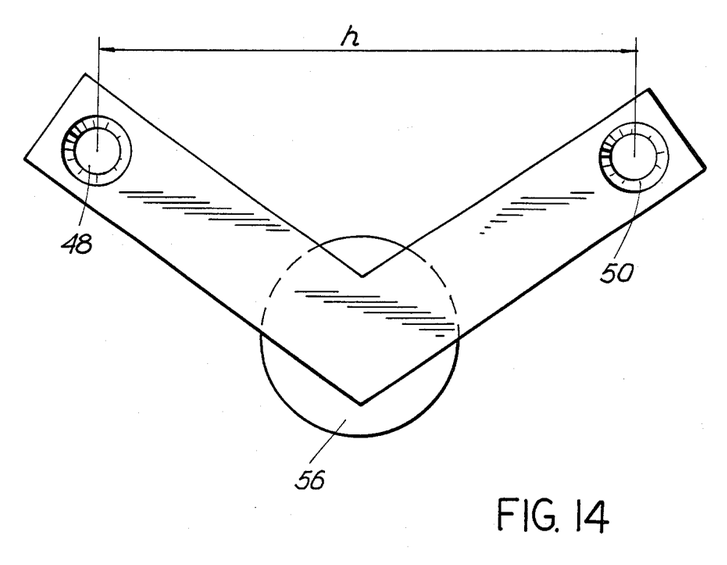
FIG. 14 is a structural schematic of a link stand.
Figure 15:
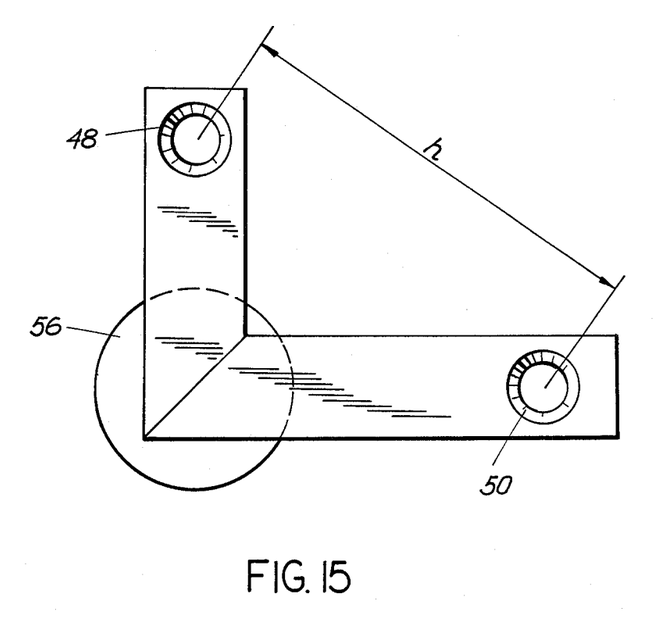
FIG. 15 is a structural schematic of another link stand.
Figure 16:
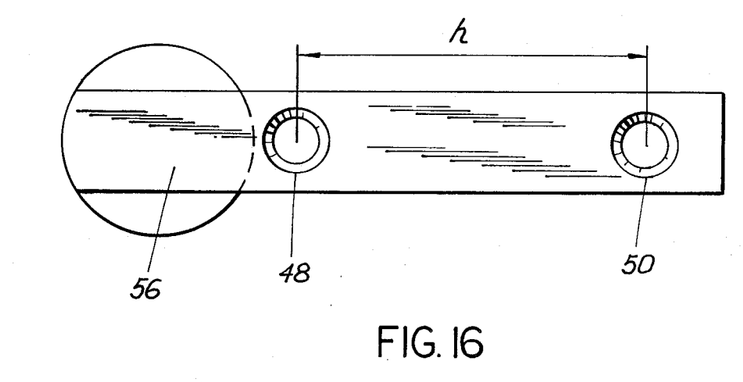
FIG. 16 is a structural schematic of still another link stand.

The positions of the two conic holes 48, 50 on the link stands are selected according to the characteristics of the automobile. As shown in FIG. 14, the two holes are located above the connecting part 56 of the link stands. This is suitable for use in automobiles with good roadability. In FIG. 15, the connection between the holes is almost perpendicular. This is suitable for use in an automobile where other disposition would hinder the engine or fuel tank. In FIG. 16, the holes are on one and the same side of the link stand relative to the connecting part 56. This is suitable for use in an automobile with a special construction. It is also possible to use various other constructions of link stands to arrange relative positions of two holes to avoid wheel interference. However, no matter how arranged, two conditions are to be met: 1. the positions of conic holes in each pair of link stands should ensure that the two spring steel shafts are parallel; and 2. the angle between the plane formed by the two parallel steel shafts and the base line of the chassis 40 should not be larger than 60°, that is, should not be in a range nearly vertical to the ground.

Figure 2:
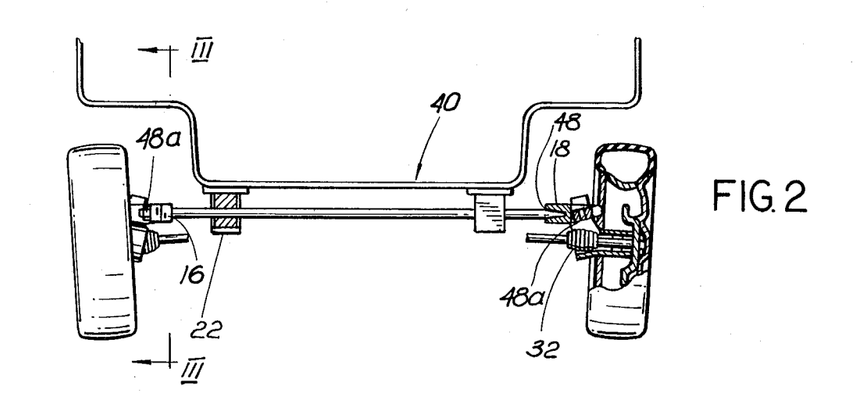
FIG. 2 is a front view of the down-supporting type front drive flexible axle suspension system of FIG. 1, partly in section.
Figure 3:
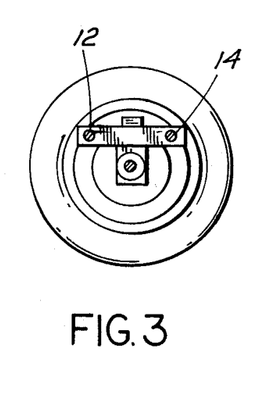
FIG. 3 is an axial elevation of a portion of FIG. 2 at line III—III, partly in section.
Figure 4:
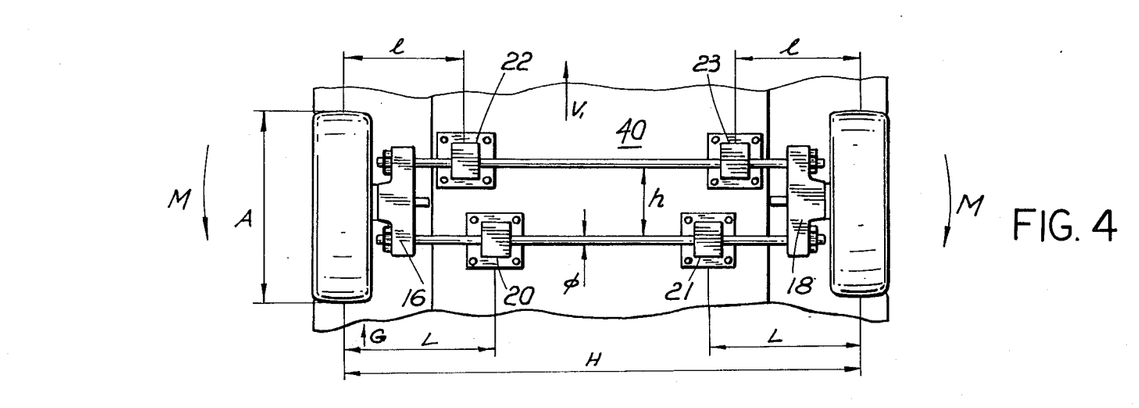
FIG. 4 is a bottom view of an upper suspending type front drive flexible axle suspension system.
Figure 5:
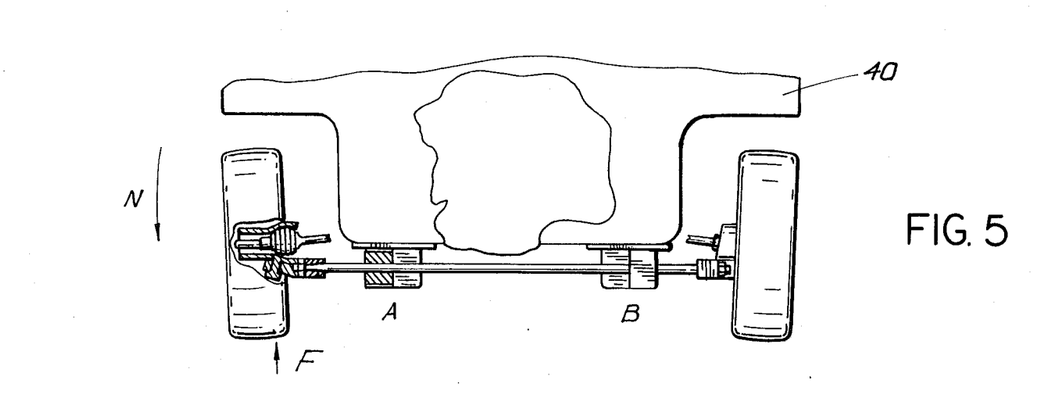
FIG. 5 is a front view of the upper suspending type front drive flexible axle suspension system of FIG. 4.
Figure 6:
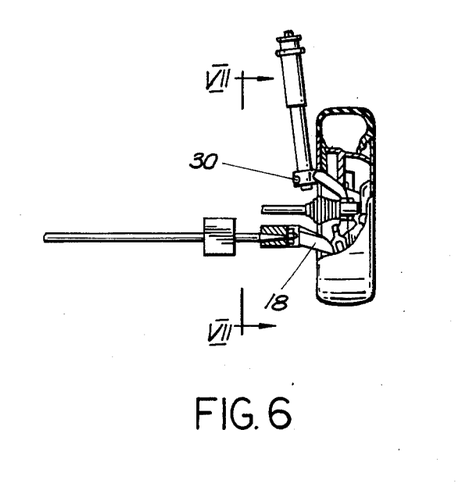
FIG. 6 is a front view of the right half of a sliding arm type front drive flexible axle suspension system; partly in section.
Figure 7:
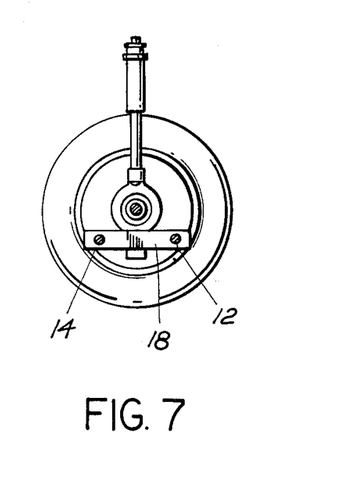
FIG. 7 is a view in direction VII—VII of the suspension system of FIG. 6.
Figure 8:
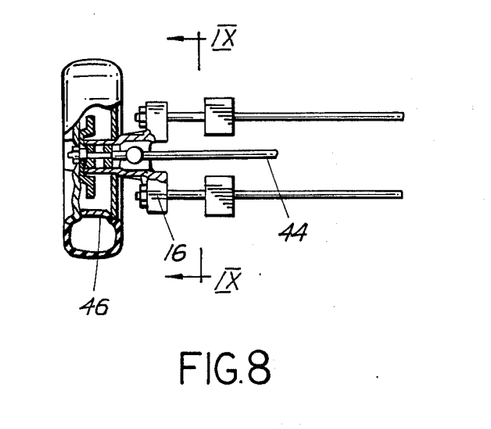
FIG. 8 is a top view of the left half of a rear drive rear flexible axle suspension system.
Figure 9:
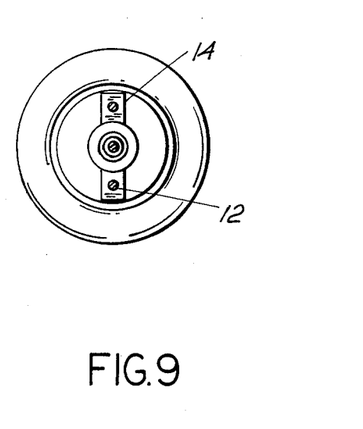
FIG. 9 is a view in direction IX—IX of the suspension system of FIG. 8.
Figure 10:
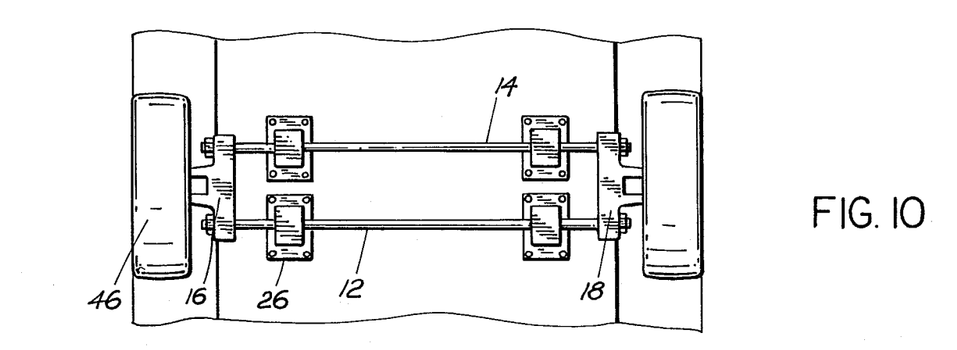
FIG. 10 is a bottom view of a passive type rear flexible axle suspension system.
Figure 11:
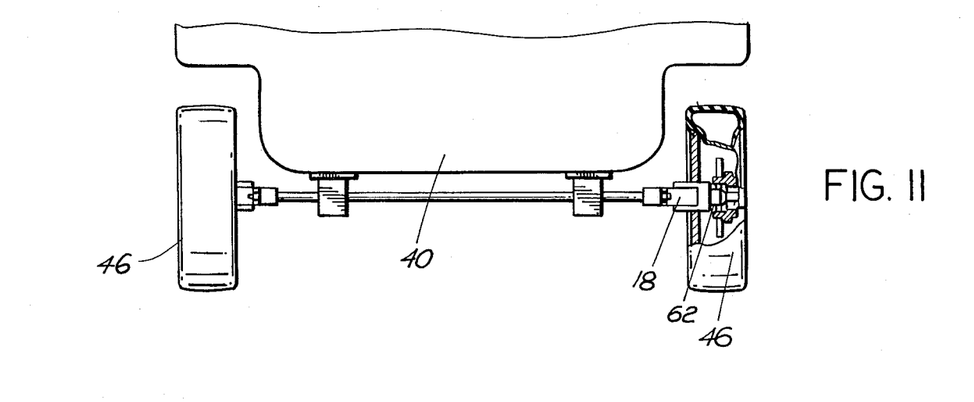
FIG. 11 is a front view of the passive type rear flexible axle suspension system of FIG. 10.
Figure 12:
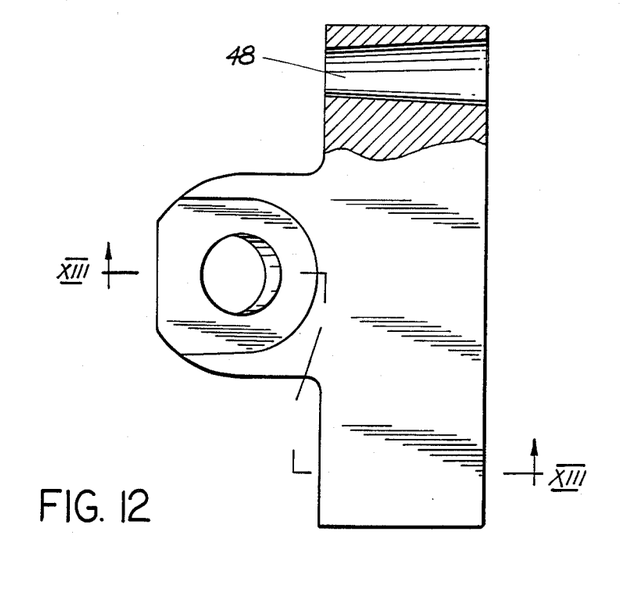
FIG. 12 is a top view of a link stand for a front axle.
Figure 13:
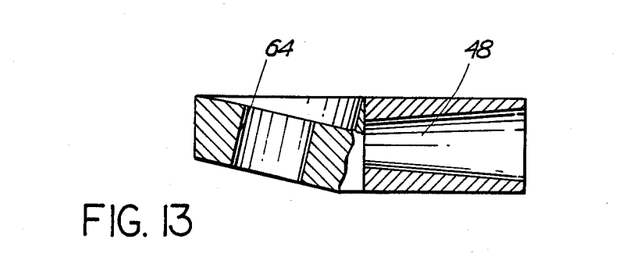
FIG. 13 is an end view of the link stand of FIG. 12 in section along line XIII—XIII.

The connecting part 56 of the link stand is designed according to specific constructions and use requirements for each case. In a front drive front axle suspension system, its drive shaft 32 may be located below the frame 10 (as shown in FIG. 2), or may be located above the frame 10 (as shown in FIG. 4 and FIG. 6). The same is true for a connecting part to connect an elevation shaft 30 or drive shaft 32. For example, FIG. 12 and FIG. 13 are simplified schematics of a link stand for a front axle where a connecting-part hole 64 is connected with an elevation shaft 30. In a rear drive rear axle suspension system (as shown in FIG. 8), the connecting part is a hole for drive shaft 44 to pass through. In a rear axle passive suspension system (as shown in FIG. 10 and 11), the connecting part is a blind hole.

The frame type flexible axle suspension system also has four supporting components, two for each steel shaft. Although they are disposed on the respective steel shafts symmetrically spaced along its longitudinal axis between the link stands (i.e. equidistant from the center line of each of the front and rear wheels), the distance of each pair of supporting components from each other on the two steel shafts may be equal or not equal. The automobile chassis or frame 40 is directly fixed on these supporting components, and the supporting components thus perform the task of connecting the suspension system and wheels 28, 46 to the vehicle frame 40.

Each supporting component consists of a supporting stand, a hoop, and an elastic sleeve.

Each elastic sleeve 20, 21, 22, 23 has a shock absorbing feature and, at the same time, functions as a hinge for guiding action. They are made of rubber or a synthetic rubber product, e.g. butyl rubber (BR), polyurethane (UR), and thermoplastic elastic material (SBS), etc. The elastic sleeves are directly put on appropriate locations on the spring steel shafts 12, 14, by adhesives, or solidifed on the spring steel shafts by a rubber vulcanizing process. The elastic sleeves may have various forms, such as cylindrical, for example.

Figure 17:
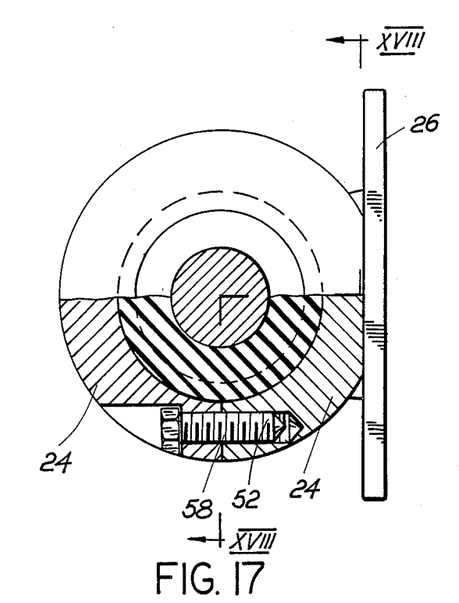
FIG. 17 is a structural schematic end view of an elastic sleeve hoop and supporting stand, partly in section.
Figure 18:
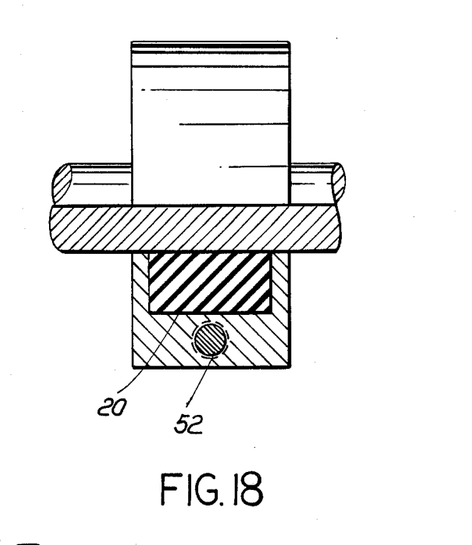
FIG. 18 is a bottom view of FIG. 17 in section along line XVIII—XVIII.
Figure 19:
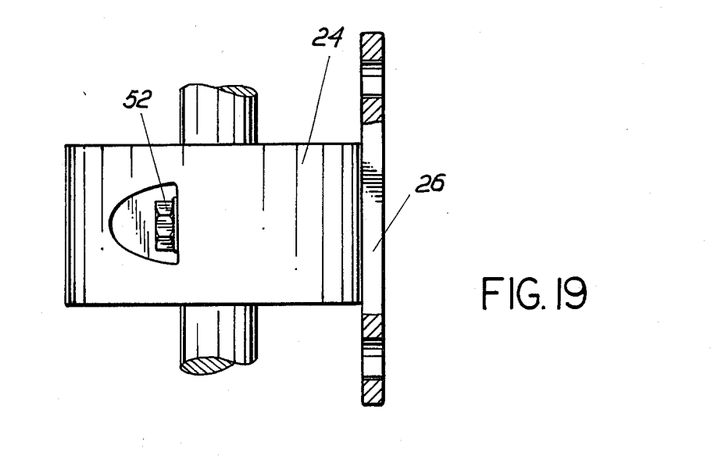
FIG. 19 is a top view of FIG. 17.

The hoops 24 are used to band the elastic sleeves firmly onto the spring steel shafts. The hoops may have various constructions. Ordinary clamping mechanisms are capable of achieving this objective. FIGS. 17, 18 and 19 show one of these ordinary hoop mechanisms, where the hoop 24 consists of two steel halves with an inner clamping surface conforming to the elastic sleeves 20, 21, 22, 23 and an outer surface conforming to the supporting stand 26. On both halves of the hoop, there are holes with threads 58. The two halves of the hoop are clamped together by bolts 52 to press the elastic sleeves tightly on the spring steel shafts 12, 14. By controlling the tightening force of the bolts, it is possible to adjust the pressure of the elastic sleeves on the sheet shafts. Together with the sticking force of adhesive therebetween, the pressure of the hoops makes the supporting components impossible to slide along the steel shafts under impact, vibration, braking or turning of the automobile. Obviously, making the elastic sleeves longer would also help prevent the above-mentioned slide. Therefore, the elastic sleeves for large automobiles should be longer than for small automobiles, but they should not be less than 20 mm., at the least.

The supporting stands 26 are fixed on the respective hoops 24. Each can be made integral with its hoop, or fixed to the hoop by mechanicnal fastening or welding. Each supporting stand has four holes. Bolts or rivets through the holes securely fasten it to the chassis 40. Each serves as a support for the chassis. The supporting stands may have round, triangular, rectangular or square forms according to the construction of the chassis, but normally rectangular for is preferred.

As described above, the distance between each pair of supporting components can be adjusted. The benefit of this is that the guiding feature and stability of the suspension can be adjusted. Since the supporting components provide the suspension with the guiding feature, and the steel shafts, with the stabilizing function, like a stabilizing rod, increasing the distance between supporting components will improve the stability of suspension, and decreasing the distance, will improve the guiding feature, but also decrease stability. Therefore, by adjusting these distances, it is possible to find an ideal combination of guiding and stabilizing features. In addition, by adjusting the distances, it is also possible to adjust the natural frequency of vibration of the elastic element--spring steel shaft combination, thus improving the smoothness of automobile ride, too. As described above, the distance between the supporting stands of the two spring steel shafts may be different, and the amount of this difference may also be adjusted. The advantage of this is that, to a certain degree, it makes the rigidity of the supsension variable in dependence upon the vehicle's loading. In this way the natural frequency of the vehicle changes very little. Smoothness of the drive of the vehicle is improved, too, which is most important for buses and cars.

Generally speaking, the two supporting components of each steel shaft should be disposed at 1/6H to 2/6H and at 4/6H to 5/6H, respectively, where H is the distance between two wheels (see FIG. 4).

The two supporting components for each steel shaft should be symmetric to the center line between the two wheels at the ends of the shaft. For example, on spring steel shaft 12, there are two elastic sleeves 20 and 21. If 20 is placed at 1/6H, where H is the distance between two wheels, then 21 should be placed at 5/6H. Elastic sleeves 20 and 21 are then symmetric to the center line between the two wheels.

However, the elastic sleeves 20 and 21 and 22 and 23 respectively on the two spring steel shafts 12 and 14 of the same frame construction are not necessarily placed at the same distance (see FIG. 4). For example, elastic sleeves 20 and 21 on the spring steel shaft 12 are placed at 2/6H and 4/6H, respectively, but elastic sleeves 22 and 23 on spring steel shaft 14 are placed at 1/6H and 5/6H, respectively. Of course, from the point of view of vehicle construction, loading condition and simplicity of maintenance, elastic sleeves 20 and 21 and 22 and 23 may be placed at the same distance between the two wheels.

In summary, the frame type flexible axle suspension system is basically characterized by two parallel spring steel shafts 12, 14, ends of each of which pass through a pair of link stands 16, 18, which are perpendicular to the spring steel shafts. Combined together, they form a frame at 10. The link stands are connected with an elevation shaft or drive shaft or wheel shaft. Elastic sleeves 20, 21 and 22, 23 are fastened on the spring steel shafts 12, 14, respectively, by hoops 24. Supporting stands 26 connect the hoops to the chassis or main beam 40 of an automobile.

In order to solve the problem of making the wheels as perpendicular to earth as possible, this frame type flexible axle suspension system may also be combined with a presently used sliding arm type or four connecting rod type (especially with a movable spherical head as its turning link) front drive front axle suspension system to give a more ideal effect (see FIG. 6).

An experimental vehicle with this new frame type flexible axle suspension system is a small truck with one row of seats and 600 kg loading capacity. For the front axle, a front drive down supporting type flexible axle suspension system (as shown in FIG. 2) is used, and on the rear axle, a passive type suspension system (as shown in FIG. 11).

Spring steel 60Si$_2$Mn was selected for the spring steel shafts of both front and rear axles. The diameter of all the steel shafts is 20 mm. The distance between the two steel shafts of the front axle is approximately one third of the wheel diameter. The distance between the two spring steel shafts of rear axle is 250 mm.

The elastic sleeves are made of rubber (BR). The have cylindrical form with inner diameters of 18 mm, thicknesses of 20 mm and lengths of 40 mm. The sleeves are firmly stuck to steel shafts with 502 adhesive. Hoops are used to fasten the elastic sleeves onto the steel shafts as shown in FIGS. 17, 19. The hoops are welded to supporting stands and fixed to the main frame of the vehicle by bolts which pass through four threaded holes in the supporting stands. Elastics sleeves of front and rear axles are all placed at 2/9H and 7/9H.

In total, there are fewer than 200 parts in the experimental frame type flexible suspension system for the front and rear axles. Construction is extremely simple.

Under full load condition, unexpected smoothness was achieved. Comfortableness is excellent. Sitting inside, people did not feel any bumping. The vehicle showed flexible turning and good guiding features.

The frame type flexible axle suspension system greatly simplifies the whole suspension mechanism, reduces the number of parts and components, makes manufacturing easier and assembly simpler, reduces cost, facilitates maintenance and repair, decreases vehicle body weight, which saves energy consumption accordingly, and reduces the noise level caused by friction between parts.

I claim:

1. A frame type flexible axle suspension system used for front and rear axles of automobiles, comprising:
   a. two parallel spring steel shafts;
   b. a pair of link stands being perpendicularly connected to and fixed to said spring steel shafts with one said link stand being placed at one side of the parallel spring steel shafts and the other being at the other side, opposite ends of the two said spring steel shafts passing through two holes provided in the respective link stands and being fixed in place to form a frame construction, means being provided in said link stands for connecting wheels respectively thereto;
   c. four elastic sleeves being fastened on two spring steel shafts by hoops with two sleeves on each spring steel shaft; and
   d. four supporting stands being connected with hoops and one end of which is fixed on a chassis or main beam of an automobile.

2. The frame type flexible axle suspension system according to claim 1, wherein materials of the two spring steel shafts are all spring steel of manganese steel series.

3. The frame type flexible axle suspension system according to claim 2, wherein said spring steel shafts are made of spring steel material of 65Mn.

4. The frame type flexible axle suspension system according to claim 2, wherein said spring steel shafts are made of spring steel material of 60 si$_2$Mn.

5. The frame type flexible axle suspension system according to claim 1, wherein said two spring steel shafts are round, and the diameter as well as the material of the two steel shafts is identical.

6. The frame type flexible axle suspension system according to claim 1, wherein the distance between said two spring steel shafts is not less than 1/5 of wheel diameter D.

7. The frame type flexible axle suspension system according to claim 1, wherein the diameter of the spring steel shafts is not less than 8 mm.

8. The frame type flexible axle suspension system according to claim 7, wherein the diameter of the spring steel shafts is about 20 mm.

9. The frame type flexible axle suspension system according to claim 1, wherein the two ends of each of the spring steel shafts are machined as threaded parts with conic parts adjacent to the threaded parts.

10. The frame type flexible axle suspension system according to claim 1, wherein said two elastic sleeves on each spring steel shaft are placed at 1/6H to 2/6H and at 4/6H to 5/6H respectively, where H is the distance between the wheels. moreover said two elastic sleeves are symmetric to center line of the distance H between two wheels.

11. The frame type flexible axle suspension system according to claim 1, wherein the contact length of each said elastic sleeve with the spring spring steel shafts may not be less than 20 mm.

12. The frame type flexible axle suspension system according to claim 1, wherein said elastic sleeves are made of rubber material.

13. The frame type flexible axle suspension system according to claim 1, wherein said elastic sleeves are made of polyurethane rubber material.

14. The frame type flexible axle suspension system according to claim 1, wherein said elastic sleeves are made of thermo-plastic elastic material.

15. The frame type flexible axle suspension system according to claim 10, wherein said elastic sleeves are stuck to the spring shafts by adhesives, and said hoops are used to bond said elastic sleeves firmly on said spring steel shafts.

16. The frame type flexible axle suspension system according to claim 1, wherein on each said link stand there are two conic holes for spring steel shafts to pass through, the conicity of the holes matches with the conicity of end parts of the steel shafts, the relative place of these two holes may be adjusted according to constructional needs, but the angle between the plane formed by said two parallel spring steel shafts and the chassis should not be larger than 60°.

17. The frame type flexible axle suspension system according to claim 16, wherein the connecting part of each said link has a hole to connect elevation shaft.

18. The frame type flexible axle suspension system according to claim 16, wherein said connecting part of each said link stand has a hole for a drive shaft to pass through.

19. The frame type flexible axle suspension system according to claim 16, wherein said connecting part of each said link stand has a blind hole for each said link stand to be connected with a wheel shaft.

20. A frame type flexible axle suspension system used for front and rear axles of an automobile comprising:
   a. two parallel spring steel shafts being made of spring steel of manganese steel series and being circular in cross-section, and the diameter as well as the material of said two spring steel shafts is identical, ends of each said steel shaft being machined with a threaded part and with a conical part adjacent to the threaded part; and
   b. a pair of link stand being perpendicular to said spring steel shafts, wherein the ends of said two spring steel shafts pass through two holes of said pair of link stands respectively to form a frame construction, two holes on each said link stands are conic holes, conicity of which matches with conicity of end parts of said steel shafts, relative position of said two holes may be adjusted according to constructional needs, but the angle between the planes formed by said two parallel spring steel shafts and the chassis should not be larger than 60 degrees, four elastic sleeves being fastened on said two spring steel shafts by hoops with two sleeves on each said spring steel shaft, two elastic sleeves on each said spring steel shaft are placed at 1/6H to 2/6H and at 4/6H and 5/6H respectively, where H is a distance between two wheels in the same shaft, moreover said two elastic sleeves are symmetric to a center line of the distance H between two wheels.

21. A frame-type, flexible-axle suspension system for a motor vehicle, comprising:
   two, parallel, spring-steel shafts, each shaft having opposite ends;
   a pair of link stands, each for connection to a wheel of a motor vehicle, the link stands being perpendicular to the shafts and rigidly connected to the shafts respectively at the opposite ends of the shafts; and
   support means for supporting the motor vehicle from the shafts, the support means comprising of elastic sleeves, pairs of the elastic sleeves being about respective ones of the shafts, each pair of the elastic sleeves being symmetrically spaced along the longitudinal axis of the respective one of the shafts, the pair of the elastic sleeves is between the link stands at the opposite ends thereof, hoops respectively about the elastic sleeves, and supporting stands respectively connected to the hoops for supporting of the motor vehicle.

* * * * *